(12) United States Patent
Chen et al.

(10) Patent No.: US 11,366,017 B2
(45) Date of Patent: Jun. 21, 2022

(54) METHOD FOR MEASURING COMPLEX DEGREE OF COHERENCE OF RANDOM OPTICAL FIELD BY USING MUTUAL INTENSITY-INTENSITY CORRELATION

(71) Applicant: SOOCHOW UNIVERSITY, Suzhou (CN)

(72) Inventors: Yahong Chen, Suzhou (CN); Zhaofeng Huang, Suzhou (CN); Fei Wang, Suzhou (CN); Yangjian Cai, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 27 days.

(21) Appl. No.: 17/252,978

(22) PCT Filed: Jun. 8, 2020

(86) PCT No.: PCT/CN2020/094814
§ 371 (c)(1),
(2) Date: Dec. 16, 2020

(87) PCT Pub. No.: WO2021/036396
PCT Pub. Date: Mar. 4, 2021

(65) Prior Publication Data
US 2021/0278283 A1    Sep. 9, 2021

(30) Foreign Application Priority Data

Aug. 26, 2019  (CN) .......................... 201910791478.3

(51) Int. Cl.
*G01J 9/02*       (2006.01)
*G01J 1/42*       (2006.01)
(Continued)

(52) U.S. Cl.
CPC ........ *G01J 9/0215* (2013.01); *G01B 9/02011* (2013.01); *G01B 9/02072* (2013.04);
(Continued)

(58) Field of Classification Search
CPC ................... G01J 9/0215; G01J 1/4257; G01J 2009/0211; G01J 2009/0265; G01J 9/02;
(Continued)

(56) References Cited

U.S. PATENT DOCUMENTS

2004/0233434 A1* 11/2004 Wang ........................ G01J 4/04
356/365
2006/0023987 A1*  2/2006 Yao ...................... G02B 6/2766
385/11

FOREIGN PATENT DOCUMENTS

CN       202975600 U    6/2013
CN       107764417 A    3/2018
(Continued)

*Primary Examiner* — Jonathan M Hansen
(74) *Attorney, Agent, or Firm* — SZDC Law PC

(57) ABSTRACT

The invention discloses a method for measuring a complex degree of coherence of a random optical field by using a mutual intensity-intensity correlation, including the steps of: building a test optical path; rotating a quarter-wave plate to enable the fast axis of the quarter-wave plate to be consistent with a polarization direction of reference light, to obtain light intensity distribution information of a first combined light; rotating the quarter-wave plate to enable the slow axis of the quarter-wave plate to be consistent with the polarization direction of the reference light, to obtain light intensity distribution information of a second combined light; blocking the reference light to obtain light intensity distribution information of to-be-tested light; blocking the to-be-tested light to obtain light intensity distribution information of the reference light; and calculating the amplitude and phase of a complex degree of coherence of the to-be-tested light.

8 Claims, 2 Drawing Sheets

(51) Int. Cl.
  *G01B 9/02055* (2022.01)
  *G01B 9/02001* (2022.01)

(52) U.S. Cl.
  CPC ........ *G01J 1/4257* (2013.01); *G01B 2290/70* (2013.01); *G01J 2009/0211* (2013.01)

(58) Field of Classification Search
  CPC ........ G01J 1/42; G01J 9/00; G01J 2001/4247; G01J 9/02011; G01J 9/02072; G01J 2290/70
  See application file for complete search history.

(56) References Cited

FOREIGN PATENT DOCUMENTS

| | | |
|---|---|---|
| CN | 110361098 A | 10/2019 |
| DE | 102006015518 B3 | 12/2007 |
| JP | 2014038004 A | 2/2014 |

\* cited by examiner

METHOD FOR MEASURING COMPLEX DEGREE OF COHERENCE OF RANDOM OPTICAL FIELD BY USING MUTUAL INTENSITY-INTENSITY CORRELATION

This application is the National Stage Application of PCT/CN2020/094814, filed on Jun. 8, 2020, which claims priority to Chinese Patent Application No. 201910791478.3, filed on Aug. 26, 2019, which is incorporated by reference for all purposes as if fully set forth herein.

FIELD OF THE INVENTION

The present invention relates to the field of optical field measurement technology, and particularly to a method for measuring a complex degree of coherence of a random optical field by using a mutual intensity-intensity correlation.

DESCRIPTION OF THE RELATED ART

Because of random fluctuations in the natural world, any optical field is inevitably accompanied with some random fluctuations in physical parameters such as light intensity, phase, and polarization. Such a random optical field is usually also referred to as a partially coherent optical field. Compared with a conventional fully coherent optical field, the partially coherent optical field has a higher degree of freedom, for example, a space-time coherence and a coherence structure distribution. It is found through the research in the recent decade that novel physical effects such as self-splitting, self-shaping, and self-healing may be generated by modulating the coherence structure of the partially coherent optical field, so that a partially coherent beam with a novel coherence structure distribution has important application in fields such as micro/nano manipulation, complex system optical communication, and novel optical imaging. For a random optical field, a spatial coherence of an optical field is a fundamental property of an electromagnetic wave, and is vital to the comprehension of the interference and transmission of classical and quantum optical waves and the interaction between matters. The spatial coherence of the optical field describes a spatial degree of coherence between two or more points of the optical field in a space. If the degree of coherence is higher, the spatial coherence of the optical field is better, and if the degree of coherence is lower, the spatial coherence is poorer. In the 50s and 60s in the last century, Wolf et al. proposed a method for quantitatively describing a spatial coherence of a random optical field, and provided the definition of a spatial degree of coherence. In the definition, the spatial degree of coherence is a complex function, and the absolute value of the complex function is between 0 and 1. When the spatial degree of coherence is equal to 0, it indicates that in this case there is no correlation between two points in a space. When the spatial degree of coherence is equal to 1, it indicates that in this case two points are fully correlated. The modulation of the coherence structure of the partially coherent optical field in the past research is mostly the modulation of the amplitude of a degree of coherence.

Currently, researchers have proposed various methods for measuring a complex degree of coherence of a random optical field. These methods may include a method of optical field interference and a method of intensity-intensity correlation. In the method of an optical field interference, a to-be-tested light field is divided into two parts, coherent superposition is performed to form an interference pattern, and complex degree of coherence information of the to-be-tested light field is eventually recovered from the interference pattern. The most classical method is the method of Young's double slit interference. In the method, to-be-tested light passes through two circular pinholes located at a particular interval, and interference pattern distribution in the far field or in the focal plane is then measured to recover a complex degree of coherence of the incident random optical field. The amplitude information of the complex degree of coherence can be obtained by calculating the visibility of the interference pattern, and phase information of the complex degree of coherence can be inversely derived by using a relative displacement between two measurements of the interference pattern. However, the solution has two critical defects during actual application. First, for the measurement of two-dimensional degree of coherence distribution of an optical field, a large quantity of far field interference patterns of two holes with different intervals need to be measured, consuming a long time. Secondly, to ensure the spatial resolution of the measured degree of coherence, the opening size of a pinhole is generally very small, thus the optical efficiency of a system is restricted, and an error in a measurement process is increased. For the method of an optical field intensity-intensity correlation, only the amplitude of the complex degree of coherence can be directly measured, the phase information is lost during measurement, and it is very time consuming to recover the phase information in a later stage.

SUMMARY OF THE INVENTION

The technical problem to be resolved by the present invention is to provide a method for measuring a complex degree of coherence of a random optical field by using a mutual intensity-intensity correlation, so that the fast and high-resolution measurement of the amplitude and phase of a complex degree of coherence for a random optical field can be implemented.

To solve the foregoing technical problem, the present invention provides a method for measuring a complex degree of coherence of a random optical field by using a mutual intensity-intensity correlation, including the following steps:

building a test optical path including a quarter-wave plate, a beam splitter, a condensing element and a light detector and using a laser as reference light, where the reference light is modulated by the quarter-wave plate and then enters the beam splitter, and to-be-tested light enters the beam splitter at the same time, the beam splitter combines the modulated reference light and the to-be-tested light to obtain combined light, and the combined light passes through the condensing element to be imaged on the light detector;

rotating the quarter-wave plate to enable the fast axis of the quarter-wave plate to be consistent with a polarization direction of the reference light, to obtain first combined light, and photographing and recording light intensity distribution information $I_s^{(1)}(r)$ of the first combined light by using the light detector;

rotating the quarter-wave plate to enable the slow axis of the quarter-wave plate to be consistent with the polarization direction of the reference light, to obtain second combined light, and photographing and recording light intensity distribution information $I_s^{(2)}(r)$ of the second combined light by using the light detector;

blocking the reference light, and photographing and recording light intensity distribution information $I(r)$ of the to-be-tested light by using the light detector;

blocking the to-be-tested light, and photographing and recording light intensity distribution information $S_r(r)$ of the reference light by using the light detector; and calculating the amplitude and phase of a complex degree of coherence of the to-be-tested light.

Preferably, the "calculating the amplitude and phase of a complex degree of coherence of the to-be-tested light" specifically includes the following steps:

S61. calculating a mutual correlation $G_S^{(1,2)}(r_1,r_2)$ between the light intensity distribution information $I_S^{(1)}(r)$ of the first combined light and the light intensity distribution information $I_S^{(2)}(r)$ of the second combined light;

S62. calculating a mutual correlation $G_B^{(1,2)}(r_1,r_2)$ obtained by adding the reference light and the to-be-tested light;

S63. calculating a difference value $\Delta G^{(1,2)}(r_1,r_2,\Delta\phi)$ between the two mutual correlations $G_S^{(1,2)}(r_1,r_2)$ and $G_B^{(1,2)}(r_1,r_2)$; and S64. analyzing the difference value $\Delta G^{(1,2)}(r_1,r_2,\Delta\phi)$ between the two mutual correlations, to obtain the amplitude and phase of the complex degree of coherence of the to-be-tested light.

Preferably, S61 specifically includes:

according to a second-order coherence matrix in the space-frequency domain, representing, by using a cross-spectral density function, a second-order statistical feature of the to-be-tested light as:

$$W(r_1,r_2)=\langle E^*(r_1)E(r_2)\rangle \quad (1),$$

where E(r) represents a random electrical field at a point r in a space, a superscript asterisk represents a complex conjugate, an angle bracket represents ensemble averaging, and in this case, a complex spatial degree of coherence between two points $r_1$ and $r_2$ in the space may be defined as:

$$\mu(r_1, r_2) = \frac{W(r_1, r_2)}{\sqrt{S(r_1)S(r_2)}}, \quad (2)$$

where $S(r)=W(r, r)=\langle I(r)\rangle$ represents average light intensity of a random optical field at the point r in the space;

in the step of "rotating the quarter-wave plate to enable the fast axis of the quarter-wave plate to be consistent with a polarization direction of the reference light", an electrical field of the reference light obtained through modulation by using the quarter-wave plate is denoted as $E_r^{(1)}(r)$, in the step of "rotating the quarter-wave plate to enable the slow axis of the quarter-wave plate to be consistent with the polarization direction of the reference light", an electrical field of the reference light obtained through modulation by using the quarter-wave plate is denoted as $E_r^{(2)}(r)$, and an electrical field of the to-be-tested light is denoted as E(r);

there is a phase difference of $$\frac{\pi}{2}$$

between the electrical fields $E_r^{(1)}(r)$ and $E_r^{(2)}(r)$, that is:

$$\Delta\phi = \text{Arg}[E_r^{(1)}(r)] - \text{Arg}[E_r^{(2)}(r)] = \frac{\pi}{2}, \quad (3)$$

where Arg represents calculating the phase of a complex function;

an electrical field $E_S^{(1)}(r)$ of the first combined light and an electrical field $E_S^{(2)}(r)$ of the second combined light are represented as follows:

$$E_S^{(1)}(r)=E(r)+E_r^{(1)}(r) \quad (4),$$

$$E_S^{(2)}(r)=E(r)+E_r^{(2)}(r) \quad (5),$$

the mutual correlation between the light intensity distribution information $I_S^{(1)}(r)$ of the first combined light and the light intensity distribution information $I_S^{(2)}(r)$ of the second combined light is:

$$G_S^{(1,2)}(r_1,r_2)=\langle I_S^{(1)}(r_1)I_S^{(2)}(r_2)\rangle \quad (6), \text{ and}$$

according to theorem of Gaussian statistics, Formula (1) to Formula (5) are substituted into Formula (6), to obtain:

$$G_S^{(1,2)}(r_1,r_2)=G_S^{(1,2)}(r_1,r_2,\Delta\phi)=S_S^{(1)}(r_1)S_S^{(2)}(r_2)+|W(r_1,r_2)|^2+2\sqrt{S_r^{(1)}(r_1)S_r^{(2)}(r_2)}\text{Re}[e^{i\Delta\phi}W(r_1,r_2)] \quad (7).$$

Preferably, S62 specifically includes:

$$G_B^{(1,2)}(r_1, r_2) = \langle [S_r^{(1)}(r_1) + I(r_1)][S_r^{(2)}(r_2) + I(r_2)]\rangle \quad (8)$$
$$= S_S^{(1)}(r_1)S_S^{(2)}(r_2) + |W(r_1, r_2)|^2.$$

Preferably, S63 specifically includes:

$$\Delta G_S^{(1,2)}(r_1,r_2,\Delta\phi)=G_S^{(1,2)}(r_1,r_2,\Delta\phi)-G_B^{(1,2)}(r_1,r_2)= \sqrt{S_r^{(1)}(r_1)S_r^{(2)}(r_2)}\text{Re}[e^{i\Delta\phi}W(r_1,r_2)] \quad (9).$$

Preferably, S64 specifically includes:
for $\Delta G^{(1,2)}(r_1,r_2,\Delta\phi)$, taking a distribution $\Delta\phi$ to be 0 and $$\frac{\pi}{2},$$

and at the same time obtaining the real part and the imaginary part of the complex degree of coherence according to Formula (2):

$$\text{Re}[\mu(r_1, r_2)] = \frac{\Delta G^{(1,2)}(r_1, r_2, \Delta\phi = 0)}{2\sqrt{S_r^{(1)}(r_1)S_r^{(2)}(r_2)S(r_1)S(r_2)}}, \quad (10)$$

and $$\text{Im}[\mu(r_1, r_2)] = \frac{\Delta G^{(1,2)}\left(r_1, r_2, \Delta\phi = \frac{\pi}{2}\right)}{2\sqrt{S_r^{(1)}(r_1)S_r^{(2)}(r_2)S(r_1)S(r_2)}}, \quad (11)$$

in the foregoing formulas, Im represents calculating the imaginary part of the complex function, and obtaining the amplitude and phase of the complex degree of coherence of the to-be-tested light by using Formula (10) and Formula (11).

Preferably, the light detector is a charge-coupled device (CCD) or a complementary metal-oxide-semiconductor (CMOS).

Preferably, the reference light is emitted by a helium-neon laser.

As compared with the prior art, the invention has the following beneficial effects:

1. The present invention achieves the fast and high-resolution measurement of the amplitude and phase of a complex degree of coherence of a random optical field by using a mutual intensity-intensity correlation.

2. There is no pinhole diffraction element in the method of the present invention. Therefore, a measurement system in the method has high optical efficiency.

3. By means of the method for measuring a complex degree of coherence of a random optical field by using a mutual intensity-intensity correlation in the present invention, the amplitude distribution of a random optical field can be measured and the phase distribution of the random optical field can be measured, thereby achieving high spatial resolution.

4. The measurement solution in the present invention is a Hanbury Brown and Twiss type experiment, and the high-order correlation has a robust feature against turbulence.

Figure 1:
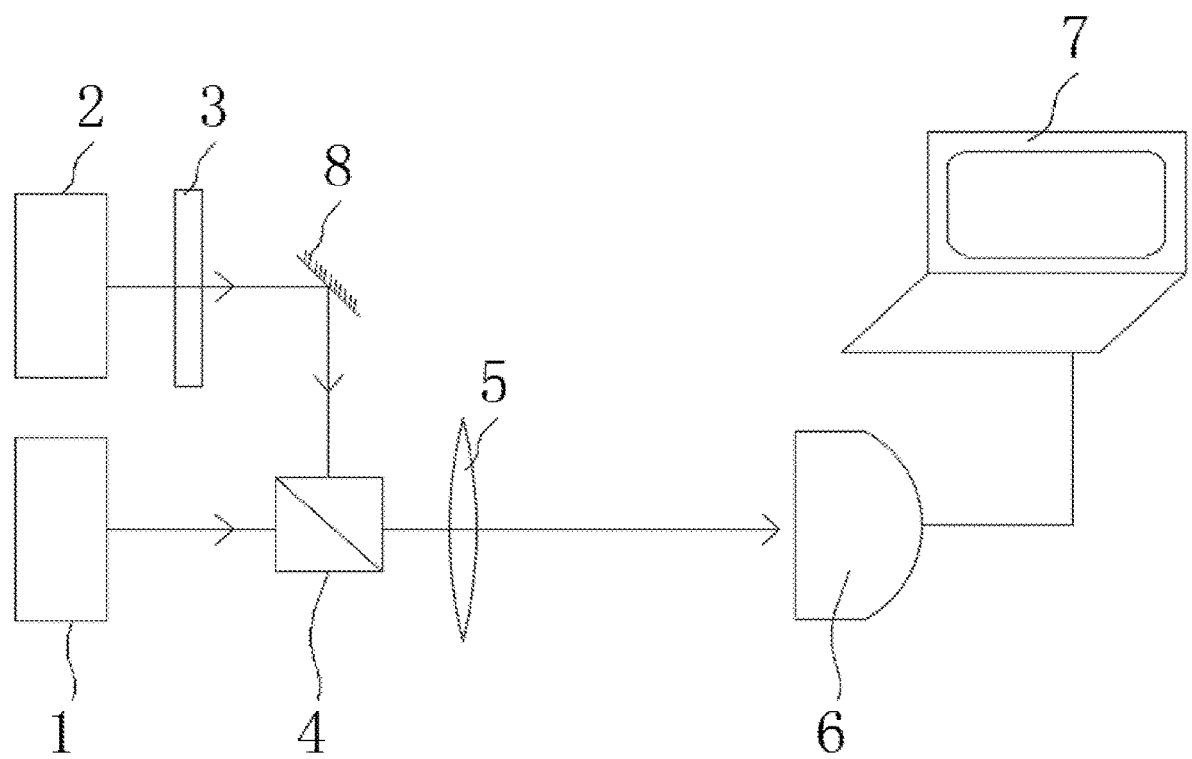
FIG. 1 is a schematic diagram of a test optical path according to the present invention.

Reference numerals: 1, to-be-tested light source; 2, reference light source; 3, quarter-wave plate; 4, beam splitter; 5, condensing element; 6, light detector; 7, computer; and 8, reflector.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not used to limit the present invention.

Figure 2:
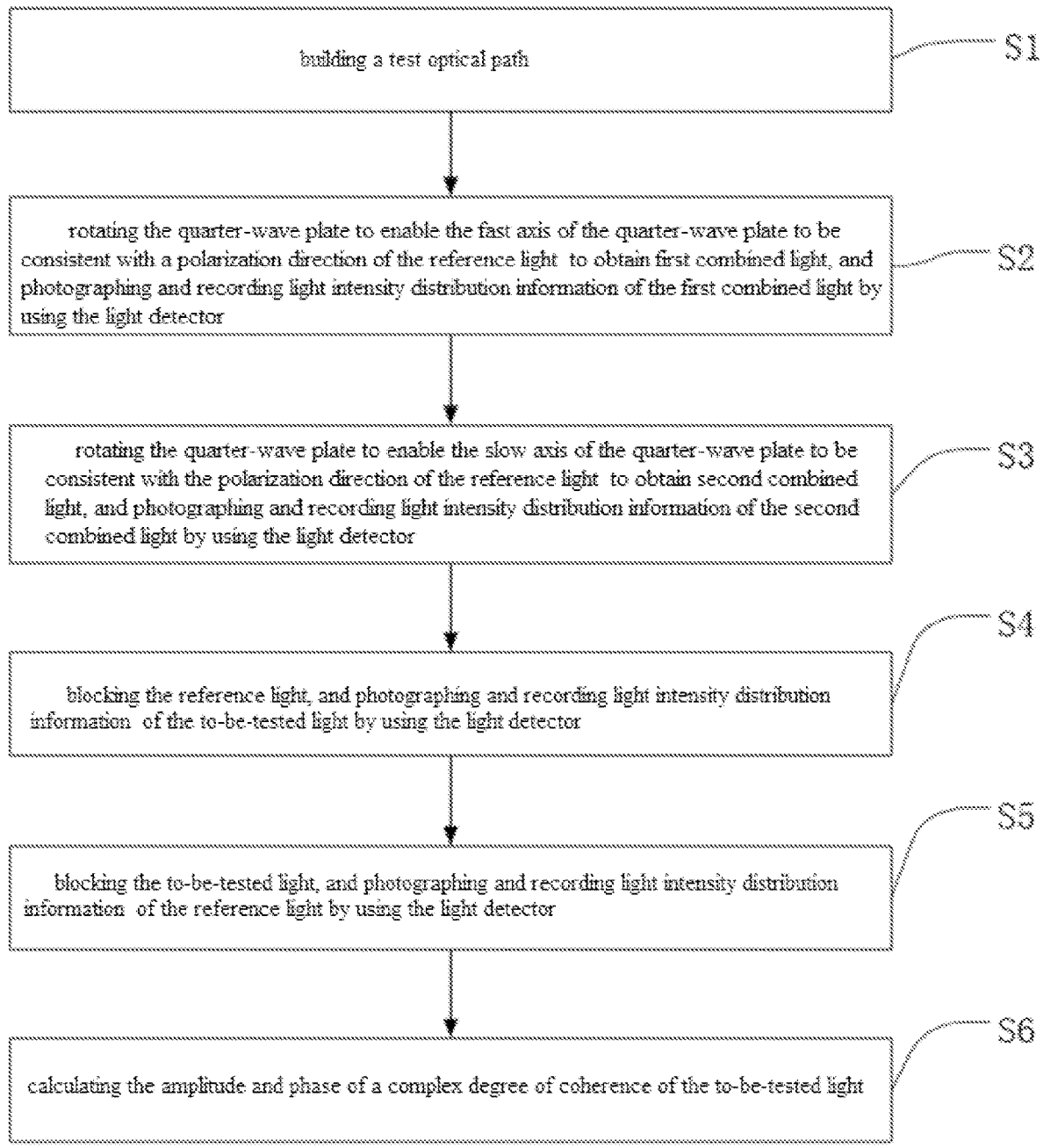
FIG. 2 is a schematic flowchart according to the present invention.

Referring to FIG. 1 and FIG. 2, the present invention discloses a method for measuring a complex degree of coherence of a random optical field by using a mutual intensity-intensity correlation, including the following steps:

S1. a test optical path including a quarter-wave plate 3, a beam splitter 4, a condensing element 5, and a light detector 6 is built, a laser is used as reference light, where reference light source 2 emits the reference light, the reference light is modulated by the quarter-wave plate and then enters the beam splitter 4, at the same time a to-be-tested light source 1 emits to-be-tested light, the to-be-tested light enters the beam splitter 4, the beam splitter 4 combines the modulated reference light and the to-be-tested light to obtain combined light, and the combined light passes through the condensing element 5 to be imaged on the light detector 6. The condensing element 5 may be a thin lens. Herein, to enable the reference light and the to-be-tested light to be both emitted to the beam splitter 4, a reflector 8 may be added to an incident optical path of the reference light or the to-be-tested light, to adjust the direction of the optical path. The light detector 6 is connected to a computer 7. The computer 7 stores information collected by the light detector 6 and performs computation. Herein, the to-be-tested light is random light.

S2. the quarter-wave plate 3 is rotated to enable the fast axis of the quarter-wave plate to be consistent with a polarization direction of the reference light, to obtain first combined light, and photographing and recording light intensity distribution information $I_S^{(1)}(r)$ of the first combined light by using the light detector.

S3. the quarter-wave plate 3 is rotated to enable the slow axis of the quarter-wave plate to be consistent with the polarization direction of the reference light, to obtain second combined light, and photographing and recording light intensity distribution information $I_S^{(2)}(r)$ of the second combined light by using the light detector.

S4. the reference light is blocked from reaching the beam splitter, and in this case, the to-be-tested light is not blocked, and light intensity distribution information $I(r)$ of the to-be-tested light is photographed and record by using the light detector.

S5. the to-be-tested light is blocked from reaching the beam splitter, and in this case, the reference light is not blocked, and light intensity distribution information $S_r(r)$ of the reference light is photographed and record by using the light detector.

S6. the amplitude and phase of a complex degree of coherence of the to-be-tested light are calculated.

The "calculating the amplitude and phase of a complex degree of coherence of the to-be-tested light" specifically includes the following steps:

S61. a mutual correlation $G_S^{(1,2)}(r_1,r_2)$ between the light intensity distribution information $I_S^{(1)}(r)$ of the first combined light and the light intensity distribution information $I_S^{(2)}(r)$ of the second combined light is calculated.

Specifically, according to the definition of a second-order coherence matrix in the space-frequency domain proposed by Wolf et al., a second-order statistical feature (including the coherence) of the to-be-tested light can be represented, by using a cross-spectral density function, as:

$$W(r_1,r_2)=\langle E^*(r_1)E(r_2)\rangle \quad (1),$$

where $E(r)$ represents a random electrical field at a point r in a space, a superscript asterisk represents a complex conjugate, an angle bracket represents ensemble averaging, and in this case, a complex spatial degree of coherence between two points $r_1$ and $r_2$ in the space may be defined as:

$$\mu(r_1, r_2) = \frac{W(r_1, r_2)}{\sqrt{S(r_1)S(r_2)}}, \quad (2)$$

where $S(r)=W(r,r)=\langle I(r)\rangle$ represents average light intensity of a random optical field at the point r in the space;

in the step of "rotating the quarter-wave plate to enable the fast axis of the quarter-wave plate to be consistent with a polarization direction of the reference light", an electrical field of the reference light obtained through modulation by using the quarter-wave plate is denoted as $E_r^{(1)}(r)$, in the step of "rotating the quarter-wave plate to enable the slow axis of the quarter-wave plate to be consistent with the polarization direction of the reference light", an electrical field of the reference light obtained through modulation by using the quarter-wave plate is denoted as $E_r^{(2)}(r)$, and an electrical field of the to-be-tested light is denoted as $E(r)$;

because $E_r^{(1)}(r)$ is an electrical field of the reference light obtained when the fast axis of the quarter-wave plate coincides with the polarization direction and $E_r^{(2)}(r)$ is an electrical field of the reference light obtained when the slow axis of the quarter-wave plate coincides with the polarization direction, there is a phase difference of $$\frac{\pi}{2}$$

between the electrical fields $E_r^{(1)}(r)$ and $E_r^{(2)}(r)$, that is:

$$\Delta\phi = \mathrm{Arg}[E_r^{(1)}(r)] - \mathrm{Arg}[E_r^{(2)}(r)] = \frac{\pi}{2}, \quad (3)$$

where Arg represents calculating the phase of a complex function;

an electrical field $E_S^{(1)}(r)$ of the first combined light and an electrical field $E_S^{(2)}(r)$ of the second combined light are represented as follows:

$$E_S^{(1)}(r)=E(r)+E_r^{(1)}(r) \qquad (4),$$

$$E_S^{(2)}(r)=E(r)+E_r^{(2)}(r) \qquad (5),$$

the mutual correlation between the light intensity distribution information $I_S^{(1)}(r)$ of the first combined light and the light intensity distribution information $I_S^{(2)}(r)$ of the second combined light is:

$$G_S^{(1,2)}(r_1,r_2)=\langle I_S^{(1)}(r_1)I_S^{(2)}(r_2)\rangle \qquad (6), \text{ and}$$

according to theorem of Gaussian statistics, Formula (1) to Formula (5) are substituted into Formula (6), to obtain:

$$G_S^{(1,2)}(r_1,r_2)=G_S^{(1,2)}(r_1,r_2,\Delta\phi)=S_r^{(1)}(r_1)S_s^{(2)}(r_2)+|W(r_1,r_2)|^2+2\sqrt{S_r^{(1)}(r_1)S_r^{(2)}(r_2)}Re[e^{i\Delta\phi}W(r_1,r_2)] \qquad (7).$$

Re represents calculating the real part of the complex function. It is found that the mutual intensity-intensity correlation $G_S^{(1,2)}(r_1,r_2,\Delta\phi)$ is correlated to a phase difference $\Delta\phi$ between reference optical paths, and the amplitude information and phase information of the degree of coherence of the to-be-tested light are also included in $G_S^{(1,2)}(r_1,r_2,\Delta\phi)$. For example: when $\Delta\phi=0$, the last term in Formula (7) includes the real part information of the complex degree of coherence; and when $$\Delta\phi=\frac{\pi}{2},$$

the last term in Formula (7) includes the imaginary part information of the complex degree of coherence. The phase difference between the two reference optical paths can be controlled to obtain the real part information and the imaginary part information of the complex degree of coherence, so as to obtain the amplitude and phase of the complex degree of coherence of a random light field. In addition, it is found from Formula (7) that the mutual intensity-intensity correlation function includes background terms.

To remove background terms, the mutual intensity-intensity correlation of incoherent superposition of the reference light and the to-be-tested light, that is, S62, is introduced.

S62. a mutual correlation $G_B^{(1,2)}(r_1,r_2)$ between the reference light and the to-be-tested light is calculated.

$$G_B^{(1,2)}(r_1,r_2) = \langle [S_r^{(1)}(r_1) + I(r_1)][S_r^{(2)}(r_2) + I(r_2)]\rangle \qquad (8)$$
$$= S_S^{(1)}(r_1)S_S^{(2)}(r_2) + |W(r_1,r_2)|^2.$$

S63. a difference value $\Delta G^{(1,2)}(r_1,r_2,\Delta\phi)$ between the two mutual correlations $G_S^{(1,2)}(r_1,r_2)$ and $G_B^{(1,2)}(r_1,r_2)$ is calculated.

$$\Delta G_S^{(1,2)}(r_1,r_2,\Delta\phi)=G_S^{(1,2)}(r_1,r_2,\Delta\phi)-G_B^{(1,2)}(r_1,r_2)=\sqrt{S_r^{(1)}(r_1)S_r^{(2)}(r_2)}Re[e^{i\Delta\phi}W(r_1,r_2)] \qquad (9).$$

S64. the difference value $\Delta G^{(1,2)}(r_1,r_2,\Delta\phi)$ between the two mutual correlations is analyzed, to obtain the amplitude and phase of the complex degree of coherence of the to-be-tested light.

For $\Delta G^{(1,2)}(r_1,r_2,\Delta\phi)$, a distribution $\Delta\phi$ is taken to be 0 and $$\frac{\pi}{2},$$

and at the same time the real part and the imaginary part of the complex degree of coherence are obtained according to Formula (2):

$$Re[\mu(r_1,r_2)] = \frac{\Delta G^{(1,2)}(r_1,r_2,\Delta\phi=0)}{2\sqrt{S_r^{(1)}(r_1)S_r^{(2)}(r_2)S(r_1)S(r_2)}}, \qquad (10)$$

and $$Im[\mu(r_1,r_2)] = \frac{\Delta G^{(1,2)}\left(r_1,r_2,\Delta\phi=\frac{\pi}{2}\right)}{2\sqrt{S_r^{(1)}(r_1)S_r^{(2)}(r_2)S(r_1)S(r_2)}}, \qquad (11)$$

in the foregoing formulas, Im represents calculating the imaginary part of the complex function, and the amplitude and phase of the complex degree of coherence of the to-be-tested light are obtained by using Formula (10) and Formula (11).

In the invention, the light detector is a CCD or a CMOS. In this embodiment, the used CCD is the professional camera of the model Grasshopper GRAS-20S4M developed by the Point Grey Company. For specific parameters, the horizontal resolution is 1624, the vertical resolution is 1224, and the frame frequency/row frequency is 30 fps. The CCD is connected to a computer installed with software named Point Grey provided by the Point Grey Company. The foregoing software is used for observing and saving image information received by the CCD. After the CCD is connected to the computer, the software Point Grey is opened to record and save the image information received by the CCD.

In the present invention, the reference light is emitted by a helium-neon laser. The helium-neon laser generates fully coherent line polarized light with a wavelength of 632.8 nanometers.

The to-be-tested light may be produced by using the solution in Patent No. CN201410399805.8.

The foregoing embodiments are merely preferred embodiments used to fully describe the present invention, and the protection scope of the present invention is not limited thereto. Equivalent replacements or variations made by a person skilled in the art to the present invention all fall within the protection scope of the present invention. The protection scope of the present invention is as defined in the claims.

What is claimed is:

1. A method for measuring a complex degree of coherence of a random optical field by using a mutual intensity-intensity correlation, comprising steps of:

building a test optical path comprising a quarter-wave plate, a beam splitter, a condensing element, and a light detector, using a laser as reference light, wherein the reference light is modulated by the quarter-wave plate and then enters the beam splitter, and to-be-tested light enters the beam splitter at the same time, the beam splitter combines the modulated reference light and the to-be-tested light to obtain combined light, and the combined light passes through the condensing element to be imaged on the light detector;

rotating the quarter-wave plate to enable the fast axis of the quarter-wave plate to be consistent with a polarization direction of the reference light to obtain first combined light, and photographing and recording light intensity distribution information $I_S^{(1)}(r)$ of the first combined light by using the light detector;

rotating the quarter-wave plate to enable the slow axis of the quarter-wave plate to be consistent with the polarization direction of the reference light to obtain second combined light, and photographing and recording light intensity distribution information $I_S^{(2)}(r)$ of the second combined light by using the light detector;

blocking the reference light, and photographing and recording light intensity distribution information $I(r)$ of the to-be-tested light by using the light detector;

blocking the to-be-tested light, and photographing and recording light intensity distribution information $S_r(r)$ of the reference light by using the light detector; and calculating the amplitude and phase of a complex degree of coherence of the to-be-tested light.

2. The method for measuring a complex degree of coherence of a random optical field by using a mutual intensity-intensity correlation according to claim 1, wherein calculating the amplitude and phase of a complex degree of coherence of the to-be-tested light comprises the following steps:

S61: calculating a mutual correlation $G_S^{(1,2)}(r_1,r_2)$ between the light intensity distribution information $I_S^{(1)}(r)$ of the first combined light and the light intensity distribution information $I_S^{(2)}(r)$ of the second combined light;

S62: calculating a mutual correlation $G_B^{(1,2)}(r_1,r_2)$ obtained by adding the reference light and the to-be-tested light;

S63: calculating a difference value $\Delta G^{(1,2)}(r_1,r_2,\Delta\phi)$ between the two mutual correlations $G_S^{(1,2)}(r_1,r_2)$ and $G_B^{(1,2)}(r_1,r_2)$; and S64: analyzing the difference value $\Delta G^{(1,2)}(r_1,r_2,\Delta\phi)$ between the two mutual correlations, to obtain the amplitude and phase of the complex degree of coherence of the to-be-tested light.

3. The method for measuring a complex degree of coherence of a random optical field by using a mutual intensity-intensity correlation according to claim 1, wherein S61 comprises:

according to a second-order coherence matrix in the space-frequency domain, representing, by using a cross-spectral density function, a second-order statistical feature of the to-be-tested light as:

$$W(r_1,r_2)=\langle E^*(r_1)E(r_2)\rangle \qquad (1),$$

wherein $E(r)$ represents a random electrical field at a point $r$ in a space, a superscript asterisk represents a complex conjugate, an angle bracket represents ensemble averaging, and in this case, a complex spatial degree of coherence between two points $r_1$ and $r_2$ in the space may be defined as:

$$\mu(r_1, r_2) = \frac{W(r_1, r_2)}{\sqrt{S(r_1)S(r_2)}}, \qquad (2)$$

wherein $S(r)=W(r,r)=\langle I(r)\rangle$ represents average light intensity of a random optical field at the point $r$ in the space;

in the step of rotating the quarter-wave plate to enable the fast axis of the quarter-wave plate to be consistent with a polarization direction of the reference light, an electrical field of the reference light obtained through modulation by using the quarter-wave plate is denoted as $E_r^{(1)}(r)$, in the step of "rotating the quarter-wave plate to enable the slow axis of the quarter-wave plate to be consistent with the polarization direction of the reference light", an electrical field of the reference light obtained through modulation by using the quarter-wave plate is denoted as $E_r^{(2)}(r)$, and an electrical field of the to-be-tested light is denoted as $E(r)$;

there is a phase difference of $$\frac{\pi}{2}$$

between the electrical fields $E_r^{(1)}(r)$ and $E_r^{(2)}(r)$, that is:

$$\Delta\phi = \text{Arg}[E_r^{(1)}(r)] - \text{Arg}[E_r^{(2)}(r)] = \frac{\pi}{2}, \qquad (3)$$

wherein Arg represents calculating the phase of a complex function;

an electrical field $E_S^{(1)}(r)$ of the first combined light and an electrical field $E_S^{(2)}(r)$ of the second combined light are represented as follows:

$$E_S^{(1)}(r)=E(r)+E_r^{(1)}(r) \qquad (4),$$

$$E_S^{(2)}(r)=E(r)+E_r^{(2)}(r) \qquad (5),$$

the mutual correlation between the light intensity distribution information $I_S^{(1)}(r)$ of the first combined light and the light intensity distribution information $I_S^{(2)}(r)$ of the second combined light is:

$$G_S^{(1,2)}(r_1,r_2)=\langle I_S^{(1)}(r_1)I_S^{(2)}(r_2)\rangle \qquad (6), \text{ and}$$

according to theorem of Gaussian statistics, Formula (1) to Formula (5) are substituted into Formula (6), to obtain:

$$G_S^{(1,2)}(r_1,r_2)=G_S^{(1,2)}(r_1,r_2,\Delta\phi)=S_S^{(1)}(r_1)S_S^{(2)}(r_2)+|W(r_1,r_2)|^2+2\sqrt{S_r^{(1)}(r_1)S_r^{(2)}(r_2)}\text{Re}[e^{i\Delta\phi}W(r_1,r_2)] \qquad (7).$$

4. The method for measuring a complex degree of coherence of a random optical field by using a mutual intensity-intensity correlation according to claim 3, wherein S62 comprises:

$$G_B^{(1,2)}(r_1, r_2) = \langle [S_r^{(1)}(r_1) + I(r_1)][S_r^{(2)}(r_2) + I(r_2)]\rangle \qquad (8)$$

$$= S_S^{(1)}(r_1)S_S^{(2)}(r_2) + |W(r_1, r_2)|^2.$$

5. The method for measuring a complex degree of coherence of a random optical field by using a mutual intensity-intensity correlation according to claim 4, wherein S63 comprises:

$$\Delta G_S^{(1,2)}(r_1,r_2,\Delta\phi)=G_S^{(1,2)}(r_1,r_2,\Delta\phi)-G_B^{(1,2)}(r_1,r_2)=\sqrt{S_r^{(1)}(r_1)S_r^{(2)}(r_2)}\text{Re}[e^{i\Delta\phi}W(r_1,r_2)] \qquad (9).$$

6. The method for measuring a complex degree of coherence of a random optical field by using a mutual intensity-intensity correlation according to claim 5, wherein S64 comprises:

for $\Delta G^{(1,2)}(r_1,r_2,\Delta\phi)$, taking a distribution $\Delta\phi$ to be 0 and $$\frac{\pi}{2},$$

and obtaining the real part and the imaginary part of the complex degree of coherence according to Formula (2):

$$\text{Re}[\mu(r_1, r_2)] = \frac{\Delta G^{(1,2)}(r_1, r_2, \Delta\phi = 0)}{2\sqrt{S_r^{(1)}(r_1)S_r^{(2)}(r_2)S(r_1)S(r_2)}}, \quad (10)$$

$$\text{Im}[\mu(r_1, r_2)] = \frac{\Delta G^{(1,2)}\left(r_1, r_2, \Delta\phi = \frac{\pi}{2}\right)}{2\sqrt{S_r^{(1)}(r_1)S_r^{(2)}(r_2)S(r_1)S(r_2)}}, \quad (11)$$

in the foregoing formulas, Im represents calculating the imaginary part of the complex function, and obtaining the amplitude and phase of the complex degree of coherence of the to-be-tested light by using Formula (10) and Formula (11).

7. The method for measuring a complex degree of coherence of a random optical field by using a mutual intensity-intensity correlation according to claim 1, wherein the light detector is a charge-coupled device (CCD) or a complementary metal-oxide-semiconductor (CMOS).

8. The method for measuring a complex degree of coherence of a random optical field by using a mutual intensity-intensity correlation according to claim 1, wherein the reference light is emitted by a helium-neon laser.

* * * * *